F. W. WRIGHT.
PENHOLDER.
APPLICATION FILED JULY 2, 1910.
998,443.
Patented July 18, 1911.
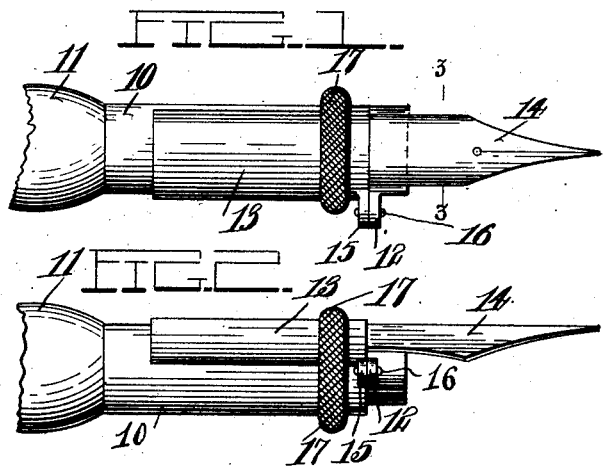
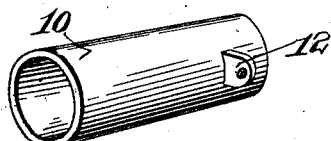
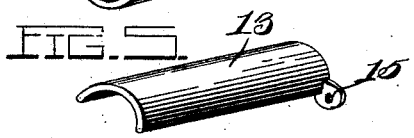
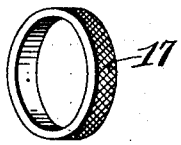
Witnesses
F. W. Taylor
C. N. Woodward
Inventor
F. W. Wright.
By
Attorneys
COLUMBIA PLANOGRAPH CO., WASHINGTON, D. C.

UNITED STATES PATENT OFFICE.

FRED W. WRIGHT, OF MEMPHIS, TENNESSEE.

PENHOLDER.

998,443.  Specification of Letters Patent. Patented July 18, 1911.

Application filed July 2, 1910. Serial No. 570,079.

*To all whom it may concern:*

Be it known that I, FRED W. WRIGHT, a citizen of the United States, residing at Memphis, in the county of Shelby, State of Tennessee, have invented certain new and useful Improvements in Penholders; and I do hereby declare the following to be a full, clear, and exact description of the invention, such as will enable others skilled in the art to which it appertains to make and use the same.

The invention relates to improvements in pen holders of the class wherein provision is made for releasing an impaired or broken pen point from the holder without soiling the fingers of the writer, and has for its object to simplify the construction and increase the efficiency and utility of devices of this character.

With this and other objects in view the invention consists in certain novel features of construction as hereinafter shown and described and then specifically pointed out in the claim, and in the drawings illustrative of the preferred embodiment of the invention, Figure 1 is a plan view of the improved device. Fig. 2 is a side elevation of the same. Fig. 3 is an end elevation with the pen point in section on the line 3—3 of Fig. 1. Fig. 4 is a perspective view of the stationary ferrule detached. Fig. 5 is a perspective view of the movable cap detached. Fig. 6 is a perspective view of the locking ring detached.

The improved device comprises a ferrule 10 mounted in the usual manner upon a handle or stock, a portion of which is represented at 11. Projecting from the ferrule at one side and spaced from its forward end, is a perforated lug 12. Bearing upon the upper side of the ferrule 10 is a clamp plate 13 segmental transversely or conforming substantially to the curvature of the ferrule and between which and the ferrule the butt end of the pen point 14 is supported, as shown. Projecting from the plate 13 at its forward end is a lug 15 corresponding to and bearing against the lug 12 of the ferrule, the two lugs being united by a pivot pin 16. By this arrangement the plate 13 is hingedly united to the ferrule at its forward end, and free to swing away from the ferrule to release the pen point, and to hold the pen point in position when located upon the ferrule as shown in Figs. 1, 2 and 3. Slidably disposed over the ferrule and the plate 13 is a locking ring 17, the latter preferably formed with its outer face milled or roughened to increase the grip of the fingers of the operator. By this simple means it will be obvious that when a pen point is inserted at its butt end between the ferrule 10 and the plate 13, and the ring 17 forced over the ferrule and its plate into the position shown in Figs. 1 and 2, the plate 13 will be firmly locked in position and hold the pen point firmly.

In the event of the breakage or impairment of the pen point it can be readily released by simply drawing the ring 17 toward the stock 11 until it passes beyond the inner end of the plate 13, when the latter can be swung to one side upon its pin 16, leaving the pen point free to drop off. A new pen point can then be inserted and the ring 17 forced outwardly in locking position as before described.

Particular attention is directed to the fact that the perforated lug 12 besides serving as a pivot securing means acts as a stop member to prevent the loss of the clamp ring 17 and it will thus be seen that without the addition of any element and without increasing the cost of the device I have provided simple and effective means for guarding against the loss of the clamp ring and consequent inoperativeness of the holder. It will also be noted that by pivoting the clamp member 13 to swing laterally I am enabled to insure gripping action along the entire length of the pen shank, and this result may be obtained with pen shanks of various lengths and curvatures within reasonable limits without changing in any manner the construction of the holder.

The improved device is simple in construction, can be inexpensively manufactured and of the same material usually employed for pen holder devices.

What is claimed is:—

A pen holder including a ferrule having a perforated lug extending laterally therefrom near the forward end, a cap member of less length than the ferrule and provided with a perforated lug extending laterally therefrom at the forward end and bearing against the lug of the ferrule and united thereto by a pivot pin to connect the cap to the ferrule for swinging laterally thereof, and a ring slidable over the ferrule and cap to clamp a pen-point therebetween.

In testimony whereof, I affix my signature, in presence of two witnesses.

FRED W. WRIGHT.

Witnesses:
HOWARD BUSSELLE,
C. OSCAR TERRY.

Copies of this patent may be obtained for five cents each, by addressing the "Commissioner of Patents, Washington, D. C."